(12) United States Patent
Guleryuz et al.

(10) Patent No.: US 8,059,902 B2
(45) Date of Patent: Nov. 15, 2011

(54) SPATIAL SPARSITY INDUCED TEMPORAL PREDICTION FOR VIDEO COMPRESSION

(75) Inventors: Onur G. Guleryuz, San Francisco, CA (US); Gang Hua, Houston, TX (US)

(73) Assignee: NTT Docomo, Inc., Toyko (JP)

( * ) Notice: Subject to any disclaimer, the term of this patent is extended or adjusted under 35 U.S.C. 154(b) by 1050 days.

(21) Appl. No.: 11/929,420

(22) Filed: Oct. 30, 2007

(65) Prior Publication Data

US 2008/0101709 A1 May 1, 2008

Related U.S. Application Data

(60) Provisional application No. 60/856,048, filed on Oct. 31, 2006.

(51) Int. Cl.
*G06K 9/46* (2006.01)

(52) U.S. Cl. ......... 382/248; 382/232; 382/233; 382/236

(58) Field of Classification Search .................. 382/232, 382/236, 238, 239, 248; 713/160; 380/216; 348/E7.056; 375/240.12, E7.075
See application file for complete search history.

(56) References Cited

U.S. PATENT DOCUMENTS

| | | | |
|---|---|---|---|
| 6,505,299 B1 * | 1/2003 | Zeng et al. ............ | 713/160 |
| 7,599,565 B2 * | 10/2009 | Kurceren et al. ........ | 382/238 |
| 2003/0095604 A1 | 5/2003 | Haskell et al. | |
| 2004/0228538 A1 | 11/2004 | Onuma et al. | |
| 2005/0025373 A1 | 2/2005 | Lee et al. | |
| 2005/0094893 A1 | 5/2005 | Samadani | |
| 2006/0188164 A1 | 8/2006 | Lee et al. | |
| 2006/0285590 A1 | 12/2006 | Guleryuz | |

FOREIGN PATENT DOCUMENTS

| | | |
|---|---|---|
| EP | 1 515 564 A2 | 3/2005 |
| EP | 1515564 A | 3/2005 |
| KR | 2005-14141 | 2/2005 |

OTHER PUBLICATIONS

Korean Office Action for corresponding Korean Patent Application No. 2008-7028608, dated Aug. 23, 2010, 4 pgs.
PCT International Search Report for PCT Application No. PCT/US2007/023037, dated May 27, 2008, 4 pages.
PCT Written Opinion of the International Searching Authority for PCT Application No. PCT/US2007/023037, dated May 27, 2008, 7 pages.

(Continued)

*Primary Examiner* — Anh Hong Do
(74) *Attorney, Agent, or Firm* — Blakely, Sokoloff, Taylor & Zafman LLP

(57) ABSTRACT

A method and apparatus are disclosed herein for spatial sparsity induced temporal prediction. In one embodiment, the method comprises: performing motion compensation to generate a first motion compensated prediction using a first block from a previously coded frame; generating a second motion compensated prediction for a second block to be coded from the first motion compensated prediction using a plurality of predictions in the spatial domain, including generating each of the plurality of predictions by generating block transform coefficients for the first block using a transform, generating predicted transform coefficients of the second block to be coded using the block transform coefficients, and performing an inverse transform on the predicted transform coefficients to create the second motion compensated prediction in the pixel domain; subtracting the second motion compensated prediction from a block in a current frame to produce a residual frame; and coding the residual frame.

25 Claims, 15 Drawing Sheets

OTHER PUBLICATIONS

Chinese Office Action for corresponding Chinese Patent Application No. 200780018080.1, Mar. 17, 2011, 4 pgs., English Translation.

International Preliminary Report on Patentability for PCT Patent Application No. PCT/US2007/023037, May 5, 2009, 8 pages.

Joint Video Team of ITU-T and ISO/IEC JTC 1, "Draft ITU T Recommendation and Final Draft International Standard of Joint Video Specification (ITU-T Rec. H.264 | ISO/IEC 14496-10 AVC)," Joint Video Team (JVT) of ISO/IEC MPEG and ITU-T VCEG, JVT-G050, Mar. 2003.

K Kamikura, H. Watanabe, H Jozawa, H. Kotera, and S. Ichinose, "Global Brightness-Variation Compensation for Video Coding," IEEE Tr. on CSVT, Dec. 1998.

T. Wedi, "Adaptive Interpolation Filter for Motion and Aliasing Compensated Prediction", Proc. Electronic Imaging 2002: Visual Communications and Image Processing (VCIP 2002), San Jose, California USA, Jan. 2002.

\* cited by examiner

--Prior Art--

Current frame

SPATIAL SPARSITY INDUCED TEMPORAL PREDICTION FOR VIDEO COMPRESSION

PRIORITY

The present patent application claims priority to and incorporates by reference the corresponding provisional patent application Ser. No. 60/856,048, titled, "Spatial Sparsity Induced Temporal Prediction for Video Compression," filed on Oct. 31, 2006.

RELATED APPLICATIONS

This application is related to U.S. patent application Ser. No. 11/471,741, entitled "A Nonlinear, Prediction Filter for Hybrid Video Compression," filed on Jun. 20, 2006, assigned to the corporate assignee of the present invention.

FIELD OF THE INVENTION

The present invention relates to the field of compression/decompression; more particularly, the present invention relates to generating predictions in the transform domain for use in motion compensation as part of compression and decompression.

BACKGROUND OF THE INVENTION

Hybrid video compression consists of encoding an anchor video frame and then predictively encoding a set of predicted frames. Predictive encoding uses motion compensated prediction with respect to previously decoded frames in order to obtain a prediction error frame followed by the encoding of this prediction error frame. Anchor frames and prediction errors are encoded using transform coders.

FIG. 1 is a block diagram of a video encoder. Referring to FIG. 1, a motion compensated (MC) prediction module generates a motion compensated prediction from a previously decoded frame. A first adder subtracts the motion compensated prediction from a current frame to obtain a residual frame. A transform coder converts a residual frame to a coded differential, for example by using a combination of a transform, a quantizer, and an entropy encoder. During decoding, a transform decoder converts the coded differential to a reconstructed residual frame, for example by using a combination of an entropy decoder, an inverse quantizer, and an inverse transform. A second adder adds the reconstructed residual frame to the motion compensated prediction to obtain a reconstructed frame. A delay element "$Z^{-1}$" stores the reconstructed frame for future reference by the MC prediction module.

There are a number of drawbacks of related art solutions. For example, some prior solutions are limited to taking advantage of very specific types of temporal dependencies among video frames. That is, the generic motion compensated prediction operation is limited to forming predictors for the current frame by using blocks from previously decoded frames directly, or by using low-pass filter based interpolations of these blocks. Once motion estimation is done and candidate blocks in the previously decoded frame(s) are found, it is assumed that these blocks or their various low-pass filtered forms are the best predictors for the blocks in the predicted frame. Many temporal variations, such as temporally independent variations on otherwise temporally correlated, frequency rich blocks, are not accounted for by related art solutions. For example, low pass filtered versions of blocks undergoing such variations can remove relevant high frequency signal components from the prediction and actually hurt performance. These unaccounted variations cause serious performance penalties as they produce motion compensated differentials that are very difficult to code with the transform coders employed in hybrid video coders. Some specific problematic temporal variations such as specific types of brightness variations have been considered by researchers. However, these solutions are not valid beyond the specific problems for which they are designed. Hence, they do not provide general and robust solutions. Also, some researchers have also devised frame adaptive motion interpolation filters but these too are limited to very specific temporal evolution models. Furthermore, because one can only have a limited number of filtering possibilities, the effectiveness of such designs is very limited over video sequences that show scenes rich with spatial frequencies.

Related art typically proceeds with a piecewise smooth frame model under uniform translational motion assumptions and runs into problems whenever actual coded frames deviate from these assumptions.

SUMMARY OF THE INVENTION

A method and apparatus are disclosed herein for spatial sparsity induced temporal prediction. In one embodiment, the method comprises: performing motion compensation to generate a first motion compensated prediction using a first block from a previously coded frame; generating a second motion compensated prediction for a second block to be coded from the first motion compensated prediction using a plurality of predictions in the spatial domain, including generating each of the plurality of predictions by generating block transform coefficients for the first block using a transform, generating predicted transform coefficients of the second block to be coded using the block transform coefficients, and performing an inverse transform on the predicted transform coefficients to create the second motion compensated prediction in the pixel domain; subtracting the second motion compensated prediction from a block in a current frame to produce a residual frame; and coding the residual frame.

BRIEF DESCRIPTION OF THE DRAWINGS

The present invention will be understood more fully from the detailed description given below and from the accompanying drawings of various embodiments of the invention, which however, should not be taken to limit the invention to the specific embodiments, but are for explanation and understanding only.

DETAILED DESCRIPTION OF THE PRESENT INVENTION

Figure 1:
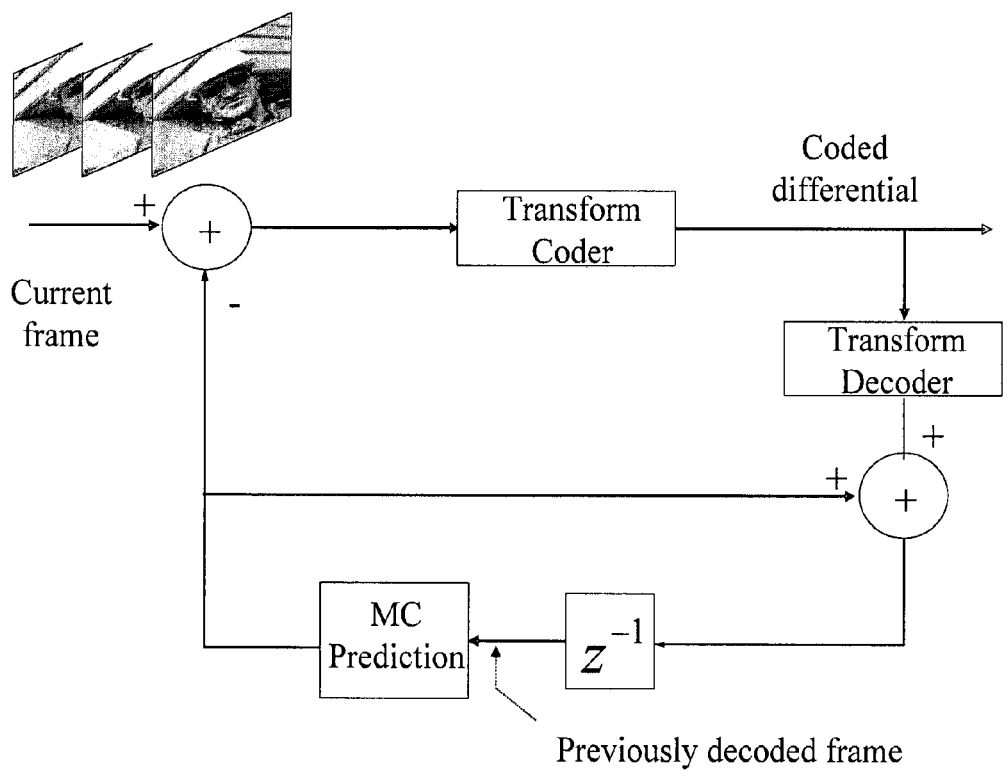
FIG. 1 is a block diagram of a video encoder.

Methods and apparatuses for improved motion compensated prediction of video frames are described. In one embodiment, the method is designed to form an automatic and successful prediction (in the mean squared error sense, for example) during sophisticated temporal evolutions encountered in video sequences. In one embodiment, the method forms a prediction of the frame to be coded based on one or more previously decoded frames.

The technique described herein can operate successfully in many scenarios where traditional motion compensated prediction fails or does not perform well. For example, when temporally uncorrelated white noise is present in video frames and prediction of the frame to be coded will benefit from the removal of the noise in the previously decoded frame, in one embodiment, the method automatically accomplishes denoising of the previously decoded frame during motion compensated prediction. Also, in one embodiment, when blending of several scenes is present in video frames and the prediction of the frame to be coded will benefit from the deblending of the previously decoded frame, the method automatically deblends during motion compensated prediction. Similarly, in one embodiment, the method automatically detects and forms successful predictors during fades, lighting changes, etc., where traditional motion compensation fails. Furthermore, the techniques described herein form successful predictions even when several sophisticated temporal evolutions are present to form a very complex temporal evolution.

In one embodiment, the techniques described herein are deployed in an encoder-decoder setting inside hybrid video compression systems where the encoder and decoder use the method within the motion compensated prediction loop to benefit from the provided prediction gains. In one embodiment, the method is based on doing adaptive prediction in a domain where the frames used in prediction and the frame to be predicted are sparse. This sparse domain can be fixed or computed optimally for the frames under consideration.

Lastly, the described techniques are robust and general, being able to effectively handle a multitude of image region types and a multitude of compression techniques. The derived predictors adaptively and autonomously develop the proper frequency selectivity for the multitude of image region types.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

Sparsity induced prediction may be used as part of a motion compensation process. More specifically, for a block to be predicted in a frame to be coded, a candidate block from previously coded frames is obtained. In one embodiment, a suitable motion compensated interpolation is applied to the candidate block, if needed. Rather than predict the block to be predicted in pixel domain, in one embodiment, the prediction is performed in the transform domain. The candidate block is thus first transformed using a linear transform to obtain its transform coefficients, and these candidate block transform coefficients are then used to predict/estimate the transform coefficients of the block to be predicted. In one embodiment, each transform coefficient of the block to be predicted is predicted by minimizing the mean squared prediction error. Once the transform coefficients of the block to be predicted are predicted, they are inverse transformed to obtain the pixel domain sparsity induced prediction.

In one embodiment, during the formation of the prediction, when necessary, the encoder determines and sends the decoder some side information that will help the decoder in forming the same prediction. Such side information may include an indication of whether the decoder is to employ or not to employ the sparsity induced prediction on the block to be predicted. Such side information may also include the prediction parameters to be used when predicting each block or a subset of the blocks to be predicted.

During decoding, the decoder replicates the prediction process and obtains the same prediction block as the encoder. In one embodiment, the sparsity induced prediction is derived directly in pixel domain (by performing computations equivalent to doing prediction in the transform domain spatially) and the final prediction operator is directly applied in the pixel domain. In one embodiment, the encoder finds an optimal transform before predicting each block so that prediction of that block is the most effective in the mean squared error sense, for example. The decoder matches the encoder computed transform, with the aid of side information if signaled by the encoder. In one embodiment, the encoder optimizes the motion compensation process so that the best sparsity induced prediction results.

As discussed in further detail below, the encoder may use available information to specify a subset of possible predictions and send the particular prediction via side information. Note that, in one embodiment, the prediction techniques of this invention are combined with approaches such as lifting to design temporal transforms to be used in video compression applications that utilize temporal transforms.

The use of sparsity induced prediction improves motion compensated predictions by providing additional prediction options that take the same blocks from the previously decoded frames but apply different prediction techniques to form better predictors of the frame to be coded. This is because if only motion is taken into account, the resulting predictions contain a lot of information that is still not relevant to the frame to be coded. Motion compensated prediction improves substantially if this irrelevant information is discarded.

For example, on video sequences containing temporally uncorrelated noise, a technique that removes the noise in the previously decoded blocks, prior to these blocks being used in predicting the frame to be coded, is beneficial. On video sequences showing a fade from one scene to another, previously decoded frames may be blends of the two scenes whereas the frame to be predicted may show only one of the two scenes. Hence, a technique that removes the irrelevant scene from the previously decoded frames can be very beneficial in forming better predictors of the frame to be predicted. Similarly lighting changes, visual effects, and other variations in video sequences can adversely affect the accuracy of motion compensated prediction. All such problems and the prediction performance loss that they cause can be alleviated with the techniques described herein.

Note that the techniques described herein can also be applied to other types of signals such as, for example, but not limited to, audio, higher dimensional signals such as images of medical volumes, etc.

Encoder and Decoder Examples

Figure 2A:
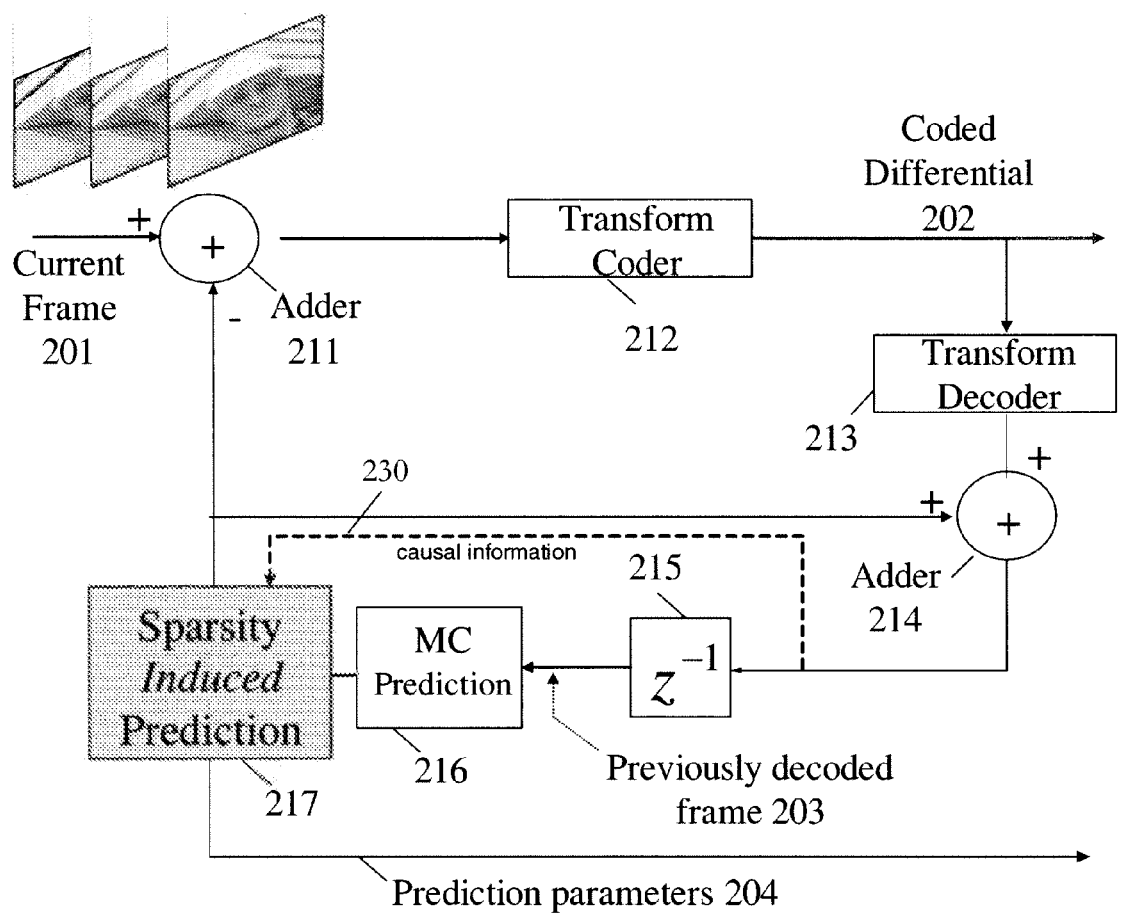
FIG. 2A is a block diagram of one embodiment of a hybrid video coder having sparsity induced prediction.

FIG. 2A is a block diagram of one embodiment of a hybrid video coder that uses sparsity induced prediction. Referring to FIG. 2A, a motion compensated (MC) prediction module 216 generates a motion compensated prediction from a previously decoded frame 203. A sparsity induced prediction module 217 augments the motion compensated prediction as described herein to produce better predictions of the frame to be coded. In one embodiment, the sparsity induced prediction module 217 augments the motion compensated prediction based on causal information, such as causal information 230.

Adder 211 subtracts the augmented motion compensated prediction from a current frame 201 to obtain a residual frame. A transform coder 212 converts a residual frame to a coded differential 202 by, for example, using a combination of a transform, a quantizer, and an entropy encoder. During decoding, a transform decoder 213 converts the coded differential to a reconstructed residual frame by, for example, using a combination of an entropy decoder, an inverse quantizer, and an inverse transform. Adder 214 adds the reconstructed residual frame to the augmented motion compensated prediction to obtain a reconstructed frame. A delay element "$Z^{-1}$" 215 stores the reconstructed frame for future reference by MC prediction module 216.

In one embodiment, a video decoder comprises a motion compensation unit to generate a predicted block using a block from a previously decoded frame, a sparsity induced prediction module augments the motion compensated prediction to produce better predictions of the frame to be decoded, a decoder to decode a residual frame, and an adder to add the residual frame to the non-linear prediction. A delay element "$Z^{-1}$" stores the filtered frame for future reference by the MC prediction module.

Figure 2B:
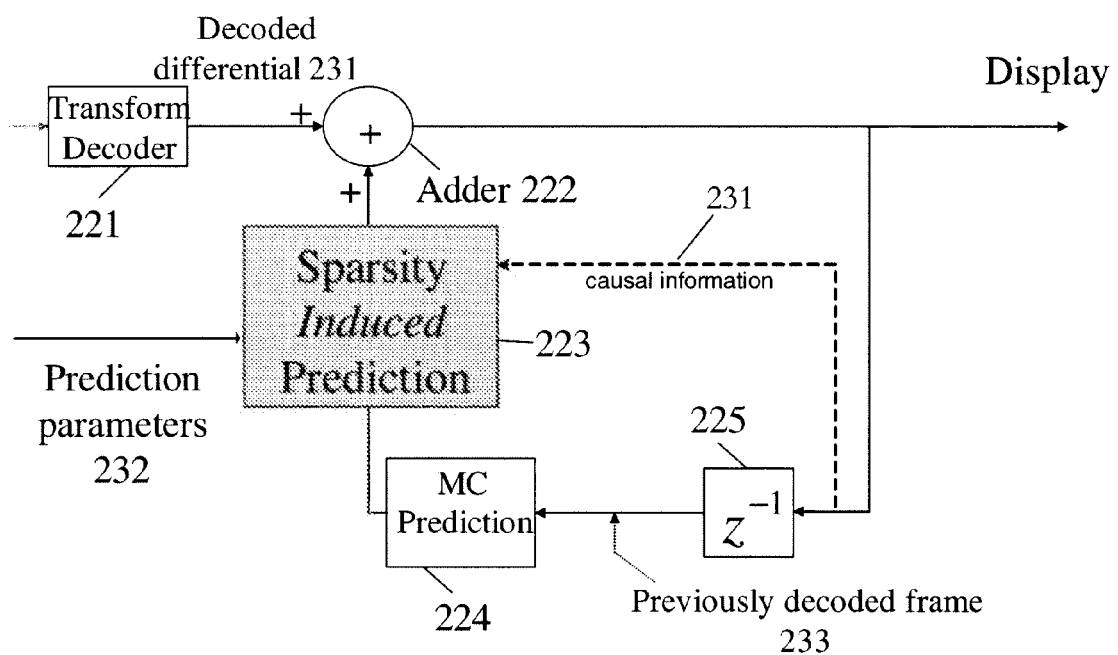
FIG. 2B is a block diagram of an enhanced video decoder.

FIG. 2B is a block diagram of one embodiment of an enhanced video decoder. Referring to FIG. 2B, a MC prediction module 224 generates a motion compensated prediction from a previously decoded frame 233. A sparsity induced prediction module 223 augments the motion compensated prediction to produce better predictions of the frame to be decoded. This is done in response to prediction parameters 232 received from the coded bitstream. In one embodiment, the sparsity induced prediction module 223 augments the motion compensated prediction based on causal information, such as causal information 231. A transform decoder 221 converts the coded differential 231 to a reconstructed residual frame by, for example, using a combination of an entropy decoder, an inverse quantizer, and an inverse transform. Adder 222 adds the reconstructed residual frame to the augmented motion compensated prediction to obtain a reconstructed frame that is output from the video decoder. The output may be sent to a display. A delay element "$Z^{-1}$" 225 also stores the filtered frame for future reference by MC prediction module 224.

The operation of the sparsity induced prediction module is further described below.

Transforms

In one embodiment, the linear transform applied to the candidate blocks (the prediction transform) as described above is an orthonormal block transform such as a block p×p DCT. Other transforms, non-orthogonal transforms, non-block transforms can also be applied. When the applied transform is non-block, one can again form predictions of transform coefficients in the frame/block to be coded and carry out an inverse transform once the prediction is accomplished as described above. Tiling of spatial regions and boundary processing with non-block transforms (wavelet transforms, lapped transforms, etc.) can be done with established techniques in signal processing. It is desirable but not necessary for this transform to have a fast implementation so that computations can be performed in an efficient manner.

Without loss of generality, assume the utilized prediction transform is a p×p block DCT. Note that in one embodiment, the utilized prediction transform is different from the transform used in transform coding of the prediction errors.

Figure 3:
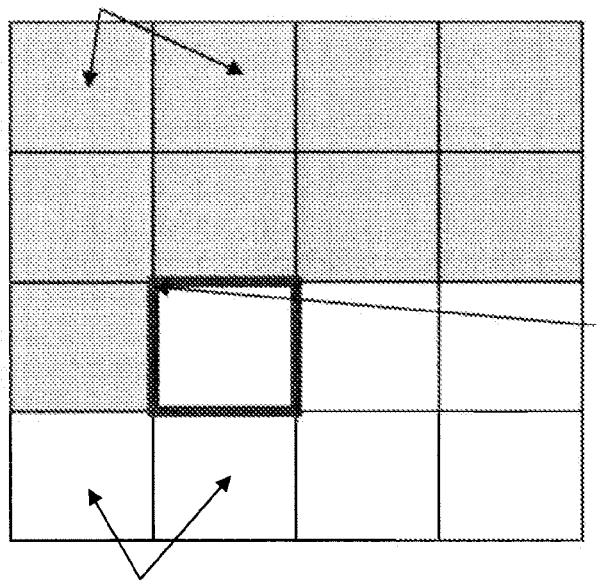
FIG. 3 illustrates an example depiction of the current frame to be coded.

The techniques described herein may be described through an example. FIG. 3 is an example depiction of the current frame to be coded showing previously encoded macroblocks in relation to the macroblocks to be coded and the current macroblock. Referring to FIG. 3, current frame 300 includes current macroblock 302 along with previously decoded macroblock 301 and macroblock 303 to be coded.

Figure 4:
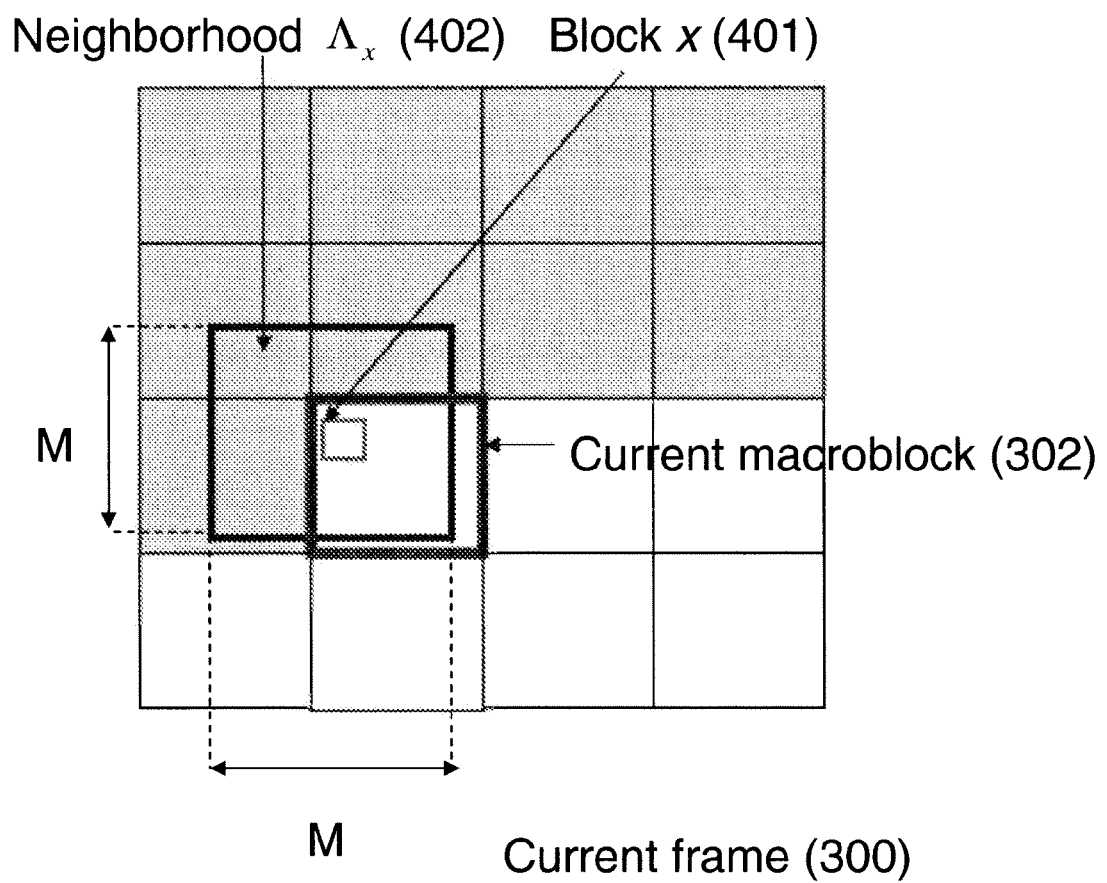
FIG. 4 illustrates an example depiction of a prediction block x and the associated neighborhood $\Lambda_x$.

For purposes herein, x denotes the p×p block to be predicted (arranged into an $p^2 \times 1$ vector). FIG. 4 is an example depiction of a prediction block x and the associated neighborhood $\Lambda_x$. Referring to FIG. 4, block x (401) is shown in current macro block 302 of current frame 300. Location of block x (401) and macro block 302 is shown relative to neighborhood $\Lambda_x$ (402).

Figure 5:
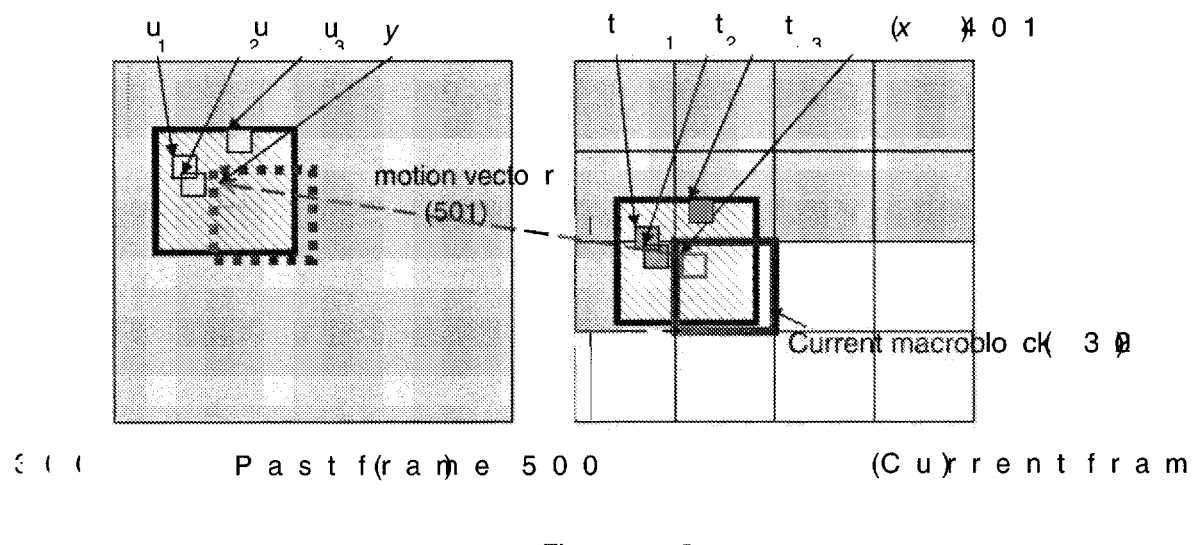
FIG. 5 illustrates an example depiction of the locations of the training blocks inside neighborhood $\Lambda_x$ and the corresponding blocks in the past frame that form the reference in motion compensated prediction

For purposes herein, y (arranged into an $p^2 \times 1$ vector) denotes the motion compensated block from the frame used in predicting x. FIG. 5 is an example depiction of the locations of the training blocks inside $\Lambda_x$ and the corresponding blocks in the past frame that forms the reference in motion compensated prediction. Referring to FIG. 5, current frame 300 and past frame 500 are shown along with the locations of training blocks $t_1$-$t_3$ inside neighborhood $\Lambda_x$ (402) and the corresponding blocks $u_1$-$u_3$ in past frame 500 that are used as a reference in motion compensated prediction that produces motion vector 501.

Let H denote the linear block transform (the prediction transform) as specified in the above paragraph (a $p^2 \times p^2$ matrix). The transform coefficients of x are given by c=Hx and the transform coefficients of y are given by d=Hy.

Let c(i) denote the ith transform coefficient of x (i=1,...$p^2$) In one embodiment c(i) is predicted from d(i) as $$\hat{c}(i) = \alpha_i d(i), \quad (1)$$

where ĉ(i) is the prediction and $\alpha_i$ is the prediction weight. Note, however, that the prediction can also be more general and nonlinear (e.g., U.S. patent application Ser. No. 11/471,741, entitled "A Nonlinear, Prediction Filter for Hybrid Video Compression", filed Jun. 20, 2006). An offset term $o_i$ can also be added to equation (1) to account for changes in the mean, via $\hat{c}(i) = \alpha_i d(i) + o_i$. Such a term can also be optimally chosen to minimize mean squared error or similar metric. Furthermore, spatial prediction techniques can be applied so that portions of d(i) that are not related to the prediction of c(i) can be removed to yield d̂(i), and the prediction formed via $\hat{c}(i) = \alpha_i \hat{d}(i) + o_i$.

In some cases (for example when more than one reference frame is available, when more than one block in the reference frame is considered a match for the block to be predicted, etc.), one can have several previously decoded blocks to predict from. In such a case, the prediction can be formed using the transform coefficients of these blocks in a linear fashion. For example, if z is another previously decoded block with transform coefficients given by e=Hz then one can form $$\hat{c}(i) = \alpha_i d(i) + \beta_i e(i). \quad (2)$$

Once the prediction ĉ(i) is formed for i=1,...,$p^2$, one can obtain the $p^2 \times 1$ vector ĉ. The predicted block x̂ is then given by $$\hat{x} = H^{-1}\hat{c}.$$

In one embodiment, the prediction weights $\alpha_i$ are determined causally using previously transmitted blocks in the frame to be predicted. Referring back to FIG. 4, for the block x, let $\Lambda_x$ denote a spatial neighborhood around x that contains at least some previously decoded pixels in the frame to be coded. As shown in FIG. 5, training blocks $t_1, t_2, ..., t_L$ are inside $\Lambda_x$ so that each $t_j \subset \Lambda_x$ and all the pixels in each $t_j$ are available, and the blocks $u_1, u_2, ..., u_L$ correspond to training blocks $t_1, t_2, ..., t_L$ in the previously decoded frame. Obtaining the transform coefficients of these blocks via $$f_j = Ht_j,$$

$$g_j = Hu_j,$$

enables obtaining $$\alpha_i = \underset{\omega}{\operatorname{argmin}} \sum_{j=1}^{L} |f_j(i) - \omega g_j(i)|^2. \quad (3)$$

The training blocks $t_1, t_2, ..., t_L$ can be overlapping so that the information in the spatial neighborhood $\Lambda_x$ is better utilized. In one embodiment, the neighborhood $\Lambda_x$ is a square neighborhood around the block x of size M×M as shown in FIG. 4. M can be, for example, M=3p (three times the size of the transform H basis functions in row/column direction), M=2p, etc. M can also be some other integer. In another embodiment, $\Lambda_x$ is a rectangular neighborhood. In yet another embodiment, the neighborhood $\Lambda_x$ has a more general shape.

In one embodiment, the above process for weight determination is extended to the cases where several blocks are utilized in the prediction process (equation (2)). In another embodiment, the prediction is extended to utilize coefficients having different indices via $$\hat{c}(i) = \sum_{k=1}^{p^2} \alpha_{i,k} d(k),$$

and obtain the prediction weights causally as above.

In one embodiment, the encoder/decoder pair optimizes the utilized transform H so that the mean squared prediction error is minimized. This operation can be performed causally by the encoder/decoder based on previously coded information, performed by the encoder non-causally and the resulting transform signaled to the decoder, or a mixture of the two. In one embodiment, optimization of the transform is done sequentially by starting with a given set of prediction weights, finding the optimal transform conditioned on the weights so that mean squared prediction error is minimized, recalculating the weights, then recalculating the transform and so on.

Figure 6:
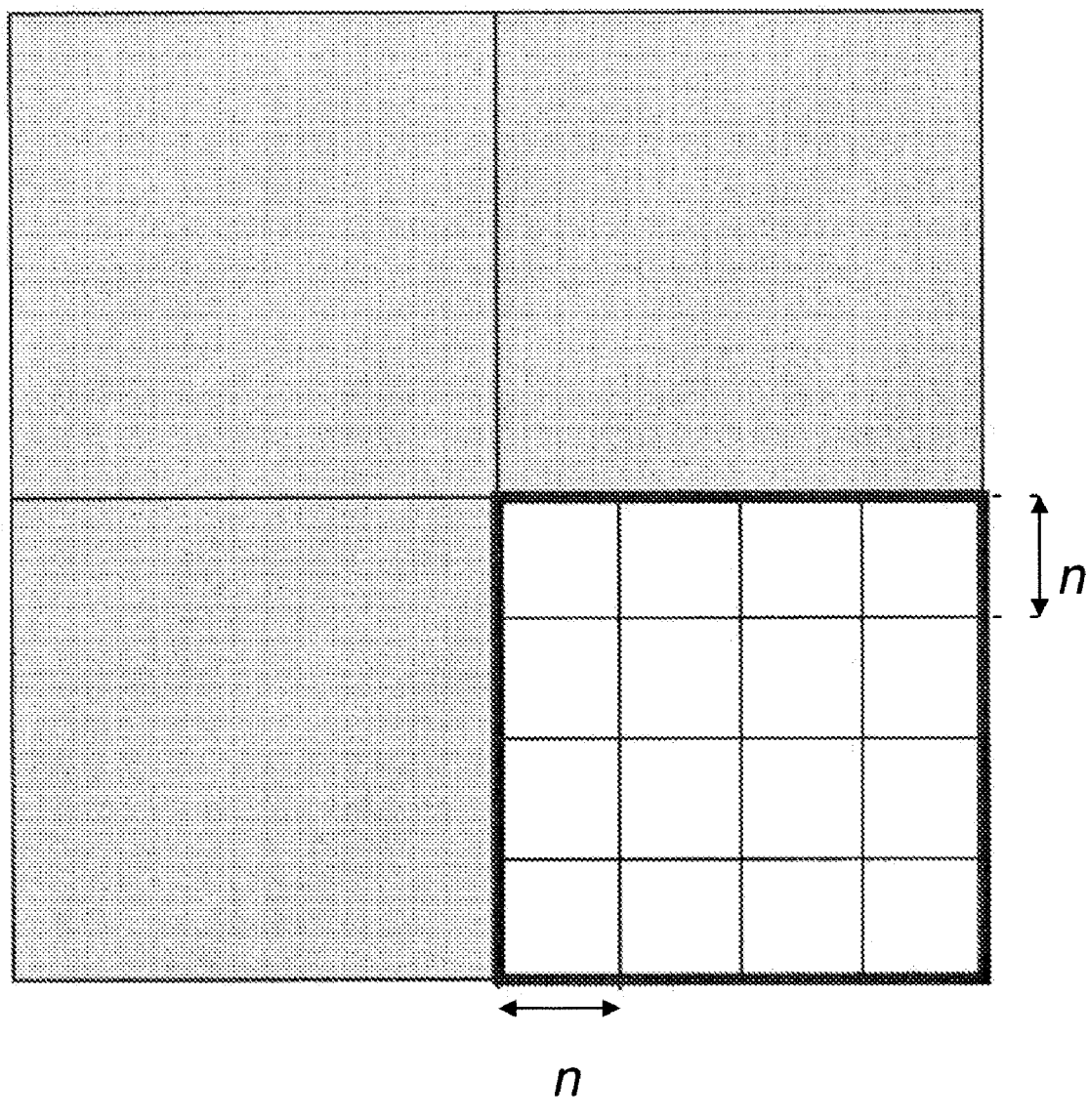
FIG. 6 illustrates shows an example decomposition of the current macroblock into n×n compression transform blocks.

The prediction operation can be done in an overlapping way so that some or all of the pixels in the spatial region to be predicted are predicted a multitude of times. The final prediction is then obtained by doing spatial, per-pixel averaging of the multitude of predictions. Suppose that a block transform of size n×n is used in transform coding the prediction errors FIG. 6 shows an example decomposition of the current macroblock into n×n compression transform blocks. When encoding the current macroblock, hence, the first n×n block is predicted, the prediction error encoded, then the second block is predicted, the prediction error for the second block is encoded, and so on. The order of this encoding can be in raster scan or in some arbitrary way.

Figure 7:
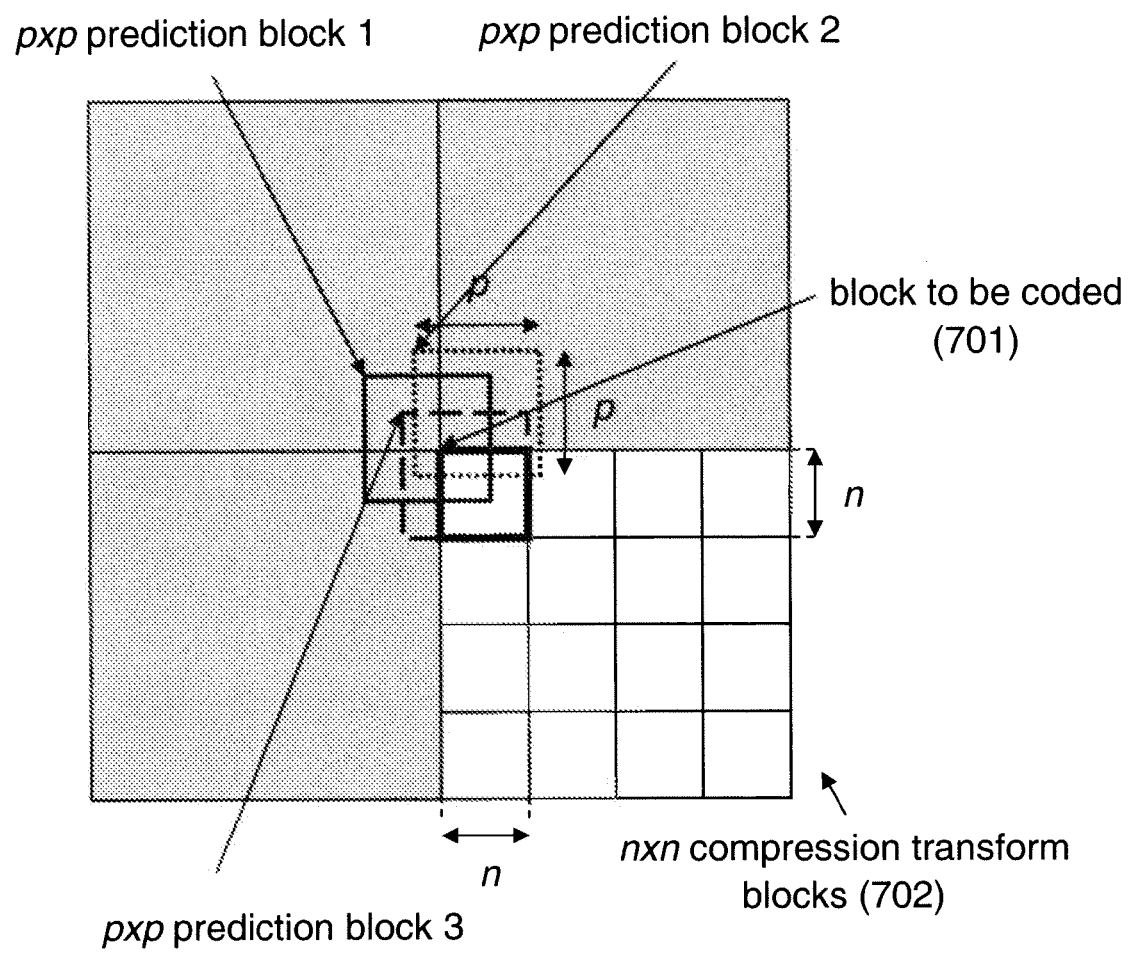
FIG. 7 illustrates an example depiction of three p×p prediction blocks overlapping the n×n block to be predicted.

FIG. 7 shows an example depiction of three p×p prediction blocks overlapping the n×n block to be predicted. Referring to FIG. 7, block to be coded 701 is shown in the n×n compression transform blocks 702. The p×p prediction blocks 1-3 overlap block 701. These three predictions are generated prior to encoding the prediction error for block 701. Each prediction predicts a p×p spatial region as marked p×p prediction block 1 through p×p prediction block 3. Each one of the p×p prediction blocks cover the n×n block differently.

Figure 8:
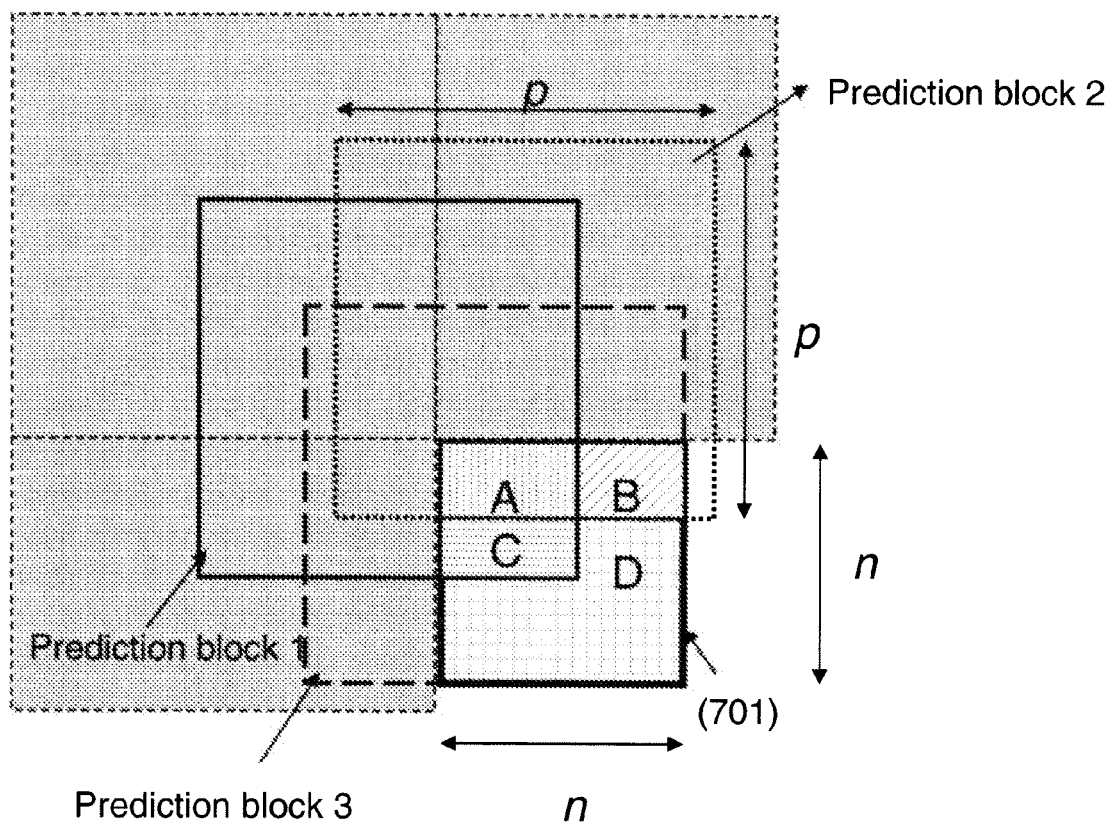
FIG. 8 illustrates the way three p×p prediction blocks of FIG. 7 form an overall prediction of an n×n block.

The n×n block to be predicted can be divided into regions (A, B, C, D) so that each one of the regions is predicted differently depending on which of the p×p prediction blocks overlap the region. FIG. 8 shows the way the three p×p prediction blocks 1-3 of FIG. 7 form an overall prediction of the n×n block 701. Pixels in region A are predicted by all three prediction blocks (the final prediction is the linear combination of three predictions) since all three prediction blocks overlap in region A. Pixels in region B are predicted by two of the prediction blocks (2 and 3) (the final prediction is the linear combination of two predictions) because prediction blocks 2 and 3 overlap there. Pixels in region C are predicted by a different two prediction blocks (1 and 3) (the final prediction is the linear combination of two predictions) because prediction blocks 1 and 3 overlap there. Pixels in region D are predicted by one prediction block (3) (since prediction block 3 doesn't overlap with any prediction blocks there).

It is understood that if a pixel has k prediction blocks overlapping it, the final prediction for this pixel is formed by the linear combination of the predictions provided by each of the p×p prediction blocks. In one embodiment, the linear combination is formed by straightforward averaging. In another embodiment, the linear combination is formed by performing weighted averaging.

Figure 9:
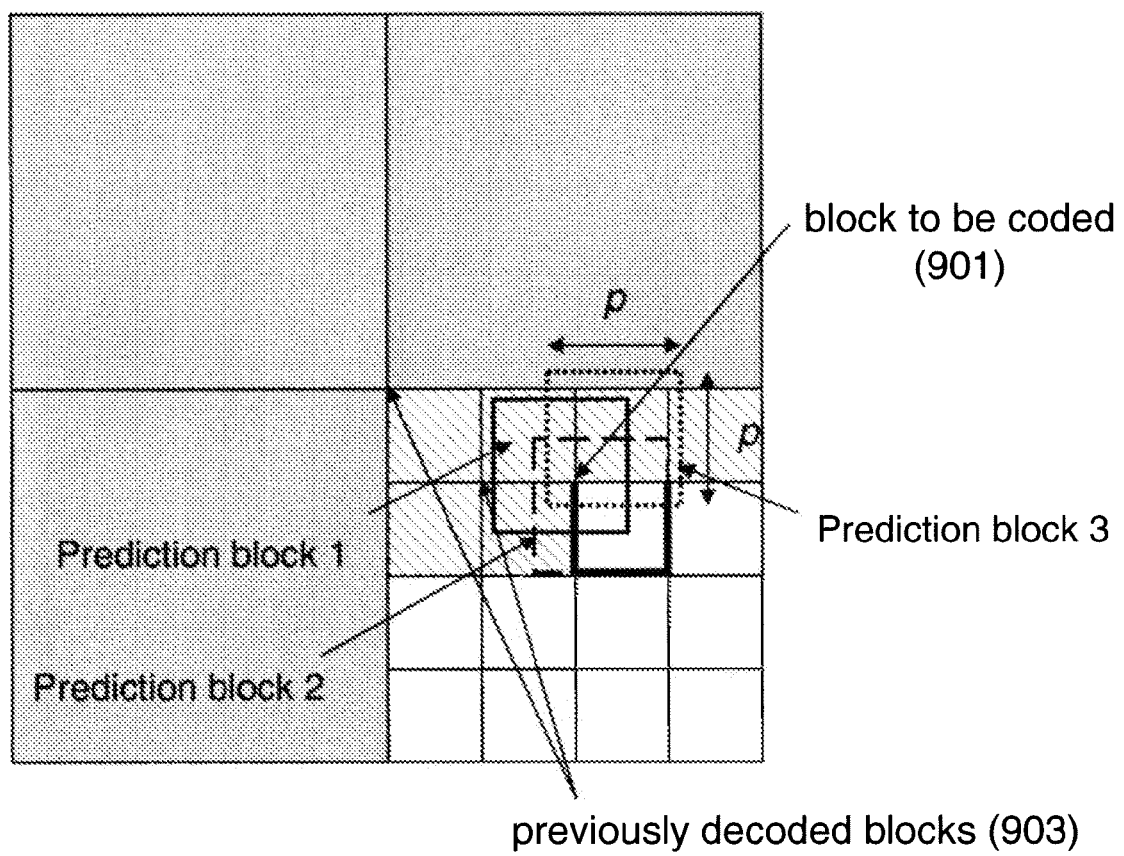
FIG. 9 illustrates the prediction of an n×n block with the aid of previously decoded macroblocks and previously decoded n×n blocks.

Since prediction weights used by the p×p prediction blocks are computed causally on a set of training blocks in one embodiment, it is advantageous to utilize previously coded n×n transform blocks to aid the current prediction. FIG. 9 shows the prediction of a n×n block with the aid of previously decoded macroblocks and previously decoded n×n blocks. Referring to FIG. 9, the prediction of the n×n block to be coded, block 901, is performed with the aid of previously decoded macroblocks and previously decoded n×n blocks (some of which are shown as previously decoded n×n blocks 903) that are used to create prediction blocks 1-3.

Once the prediction is formed, the encoder can decide to use this prediction or discard it in favor of others for example using techniques outlined in U.S. patent application Ser. No. 11/471,741, entitled "A Nonlinear, Prediction Filter for Hybrid Video Compression", filed Jun. 20, 2006. The encoder may also send side information that helps specify the prediction and prediction weights. The encoder may also optimize the search for the motion vectors so that the best sparsity induced prediction results. The encoder may also use causal training blocks to specify a subset of possible prediction weights and send the particular weights via side information. In one embodiment, the encoder also use causal training blocks to construct a probability distribution of possible prediction weights and send the particular weights via side information obtained through entropy coding based on the constructed distribution. The encoder may also use vector quantization and vector coding techniques in specifying the predictors of the coefficients of the block to be predicted. In one embodiment, the method can be combined with prediction based transform design approaches (such as lifting based approaches) in video compression applications that utilize temporal transforms.

Note that embodiments of the present invention can accommodate video coders that use block as well as non-block transforms in transform coding.

Embodiments of the present invention are applicable to video frames that have pixel values due to a large range of statistics, such as low-pass, band-pass, high-pass, texture, edge, etc. However, the invention is not limited to video frames that have smoothly varying pixel values.

One embodiment of the present invention is effective in prediction over a wide range of temporal evolutions of video. In one embodiment, the rate-distortion performance on typical video frames and the visual quality on typical video frames are better than the related art.

Embodiments of the present invention also can be deployed in a way that achieves low computational complexity.

Various Embodiments

In one embodiment, the prediction transform utilized in the sparsity induced prediction process is a p×p block DCT, where p could be 4, 5, 8, 16, etc. In one embodiment, the transform coefficient prediction is performed using Equation 1 and prediction weights are obtained via equation 3. All overlapping p×p blocks (as determined by a p×p sliding window) that correspond to available, already coded data in the neighborhood $\Lambda_x$ are used in the training, i.e., in the computation in Equation 3.

With respect to prediction formation, a p×p prediction block is formed if at least one training block is available for the determination of weights of that prediction block. In one embodiment, overlapping prediction is performed at all shifts so that each pixel in the n×n transform block has the maximum possible number of predictions. This number is only limited by the amount of previously decoded information available for the formation of the predictions.

In one embodiment, the per-pixel averaging of the multiple predictions is given by weighted averaging. This can be done with equal weights or using more sophisticated weight determination techniques known in the art, such as, for example, Onur G. Guleryuz, "Weighted Overcomplete Denoising," Proc. Asilomar Conference on Signals and Systems, Pacific Grove, Calif., November 2003.

Note that although the above description is described in terms of blocks, regions of other sizes and shapes (e.g., non-block) may be used in conjunction with the present invention, including, but not limited to having predicted vectors and predicting vectors correspond to regions of general size and shape, i.e., non-block.

Examples of Encoding and Decoding Processes

Figure 10:
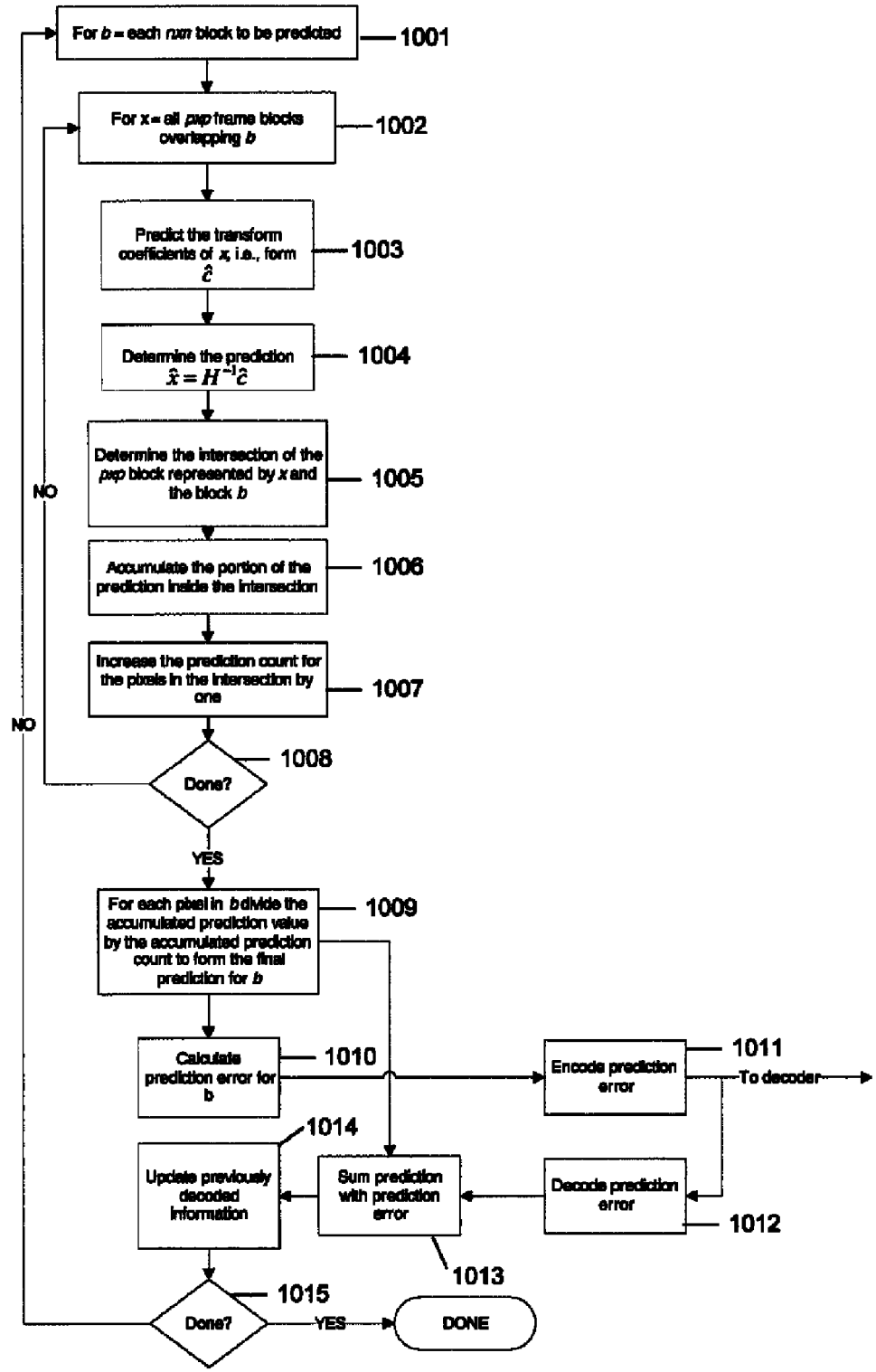
FIG. 10 is a flow diagram of one embodiment of a process for performing sparsity induced prediction of blocks in the encoder.

FIG. 10 is a flow diagram of one embodiment for a process for sparsity induced predicting of blocks in an encoder. The process is performed by processing logic that may comprise hardware (e.g., circuitry, dedicated logic, etc.), software (such as is run on a general purpose computer system or a dedicated machine), or a combination of both.

Referring to FIG. 10, the process begins by processing logic setting the variable b equal to each n×n block to be predicted (processing block 1001) and setting the variable x equal to all p×p frame blocks overlapping b (processing block 1002). For each block b to be predicted, processing logic takes each p×p block and predicts the transforms coefficients of x (processing block 1003). These predictions in the transform domain are referred to herein as ĉ.

Processing logic then determines a spatial prediction x̂ (processing block 1004). The spatial prediction x̂ is determined by inverse transforming the prediction ĉ.

Next, processing logic determines the intersection of the p×p block represented by x and the block b (processing block 1005). In other words, the relevant component of the spatial prediction is determined as the portion of it that overlaps b. Processing logic accumulates the portion of the prediction inside the intersection (processing block 1006). Thus, the relevant component is accumulated over relevant pixels in b. Processing logic increases the prediction count for the pixels in the intersection by one (processing block 1007).

Processing logic then checks whether all p×p frame blocks overlapping b have been considered (processing block 1008). If not, the process transitions to processing block 1002 where the process continues. If it has, processing block transitions to processing block 1009.

At processing block 1009, processing logic, for each pixel in b, divides the accumulated prediction value by the accumulated prediction count to form the final prediction for b. The accumulation and the prediction count enables the final prediction determination so that if a pixel in b is predicted by k p×p blocks ($k \geq 1$), the accumulation is the sum of the k predictions, the prediction for the pixel is k and the final predication is the accumulation divided by k.

Once the final prediction is formed, processing logic calculates the prediction error for b (processing block 1010). Processing logic encodes the prediction error (processing block 1011) and sends the prediction error to the decoder.

Processing logic also decodes the prediction error (processing block 1012). This is the same prediction error as would be decoded by a decoder. Processing logic adds the decoded prediction error to the prediction generated at processing block 1009 (processing block 1013). This forms the decoded block b. Processing logic adds the decoded block b to the previously decoded blocks produced by future prediction operations (processing block 1014). This in essence updates the previously decoded information.

Processing logic then detects whether each n×n block to be predicted has been predicted (processing block 1015). If so, the process is done; if not, the process transitions to processing block 1001, where the process repeats.

Figure 11:
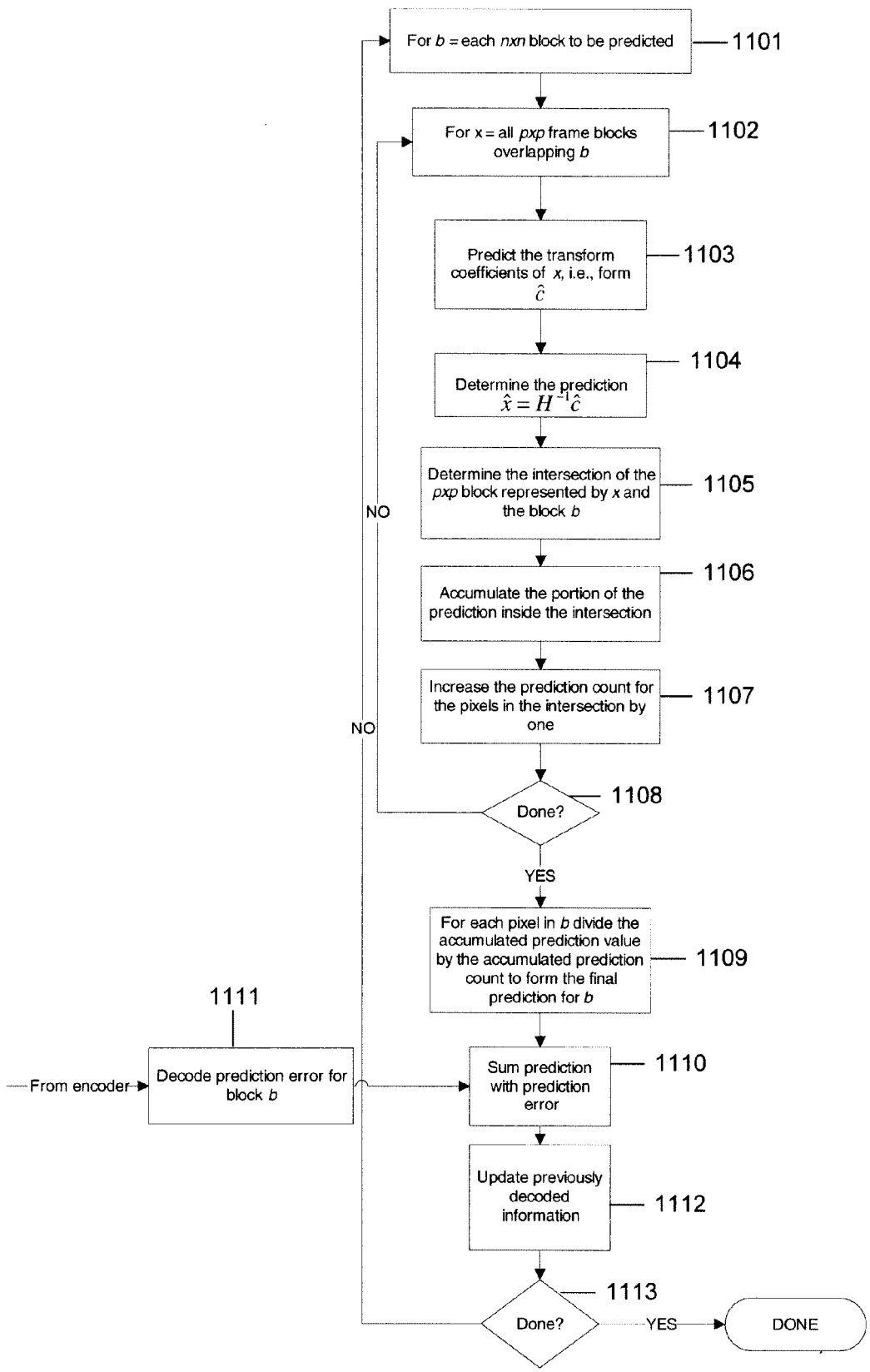
FIG. 11 is a flow diagram of one embodiment of a process for performing sparsity induced prediction of blocks in the decoder.

FIG. 11 is a flow diagram of one embodiment of a process for sparsity induced prediction of blocks in the decoder. The process is performed by processing logic that may comprise hardware (e.g., circuitry, dedicated logic, etc.), software (such as is run on a general purpose computer system or a dedicated machine), or a combination of both.

Referring to FIG. 11, the process begins by processing logic setting the variable b equal to each n×n block to be predicted (processing block 1101) and setting the variable x equal to all p×p frame blocks overlapping b (processing block 1102). For each block b to be predicted, processing logic takes each p×p block and predicts the transforms coefficients of x (processing block 1103). These predictions in the transform domain are referred to herein as ĉ.

Processing logic then determines a spatial prediction x̂ (processing block 1104). The spatial prediction x̂ is determined by inverse transforming the prediction ĉ.

Next, processing logic determines the intersection of the p×p block represented by x and the block b (processing block 1105). In other words, the relevant component of the spatial prediction is determined as the portion that overlaps b. Processing logic accumulates the portion of the prediction inside the intersection (processing block 1106). Thus the relevant component is accumulated over relevant pixels in b. Processing logic increases the prediction count for the pixels in the intersection by one (processing block 1107).

Processing logic then checks whether all p×p frame blocks overlapping b have been considered (processing block 1108). If not, the process transitions to processing block 1102 where the process continues. If it has, processing block transitions to processing block 1109.

At processing block 1109, processing logic, for each pixel in b, divides the accumulated prediction value by the accumulated prediction count to form the final prediction for b. The accumulation and the prediction count enables the final prediction determination so that if a pixel in b is predicted by k p×p blocks ($k \geq 1$), the accumulation is the sum of the k predictions, the prediction for the pixel is k and the final predication is the accumulation divided by k.

After forming the final prediction, processing logic sums the prediction with the prediction error (processing block 1110), where processing logic decodes the prediction error for block b that is received from the decoder (processing block 1111).

After summing the prediction with the prediction error, processing logic updates the previously decoded information (processing block 1112). In one embodiment, updating the previously decode information comprises adding the decoded block b to previously decoded blocks for use in the future.

After updating the previously decoded information, processing logic checks whether each n×n block to be predicted has been predicted (processing block 1113). If so, the process is done; if not, the process transitions to processing block 1101 where the process repeats.

Figure 12:
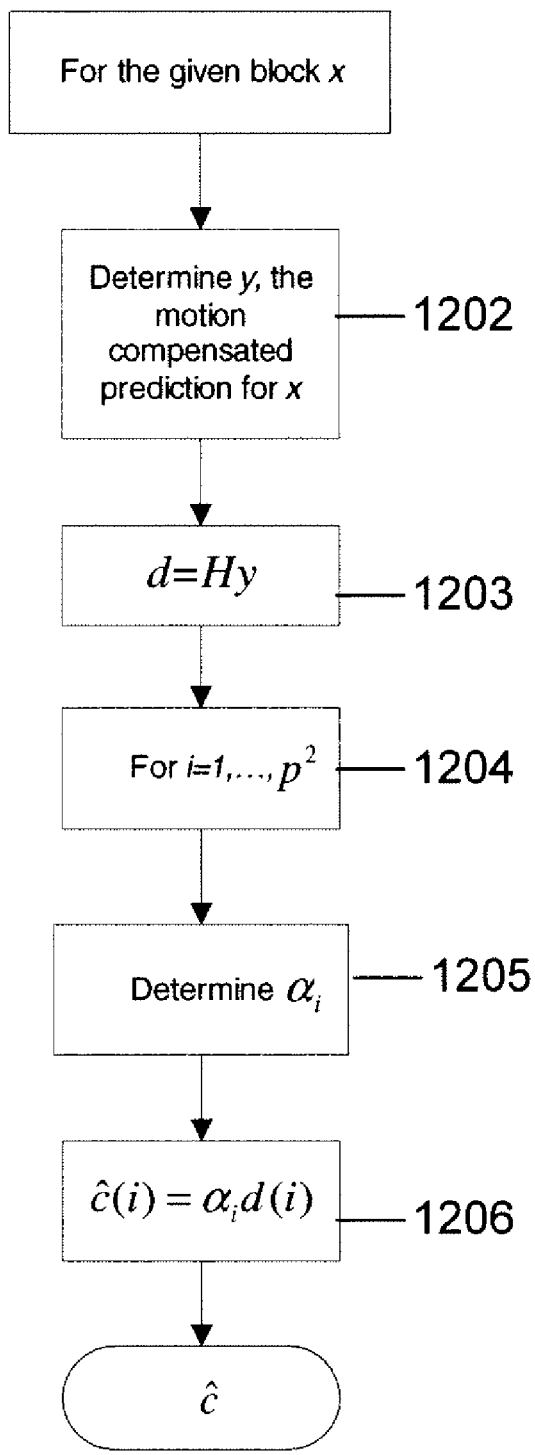
FIG. 12 is a flow diagram of one embodiment of a process for forming a transform domain prediction.

FIG. 12 is a flow diagram of one embodiment of a process for performing a transform domain prediction. The process is performed by processing logic that may comprise hardware (e.g., circuitry, dedicated logic, etc.), software (such as is run on a general purpose computer system or a dedicated machine), or a combination of both.

Referring to FIG. 12, the process begins, for each given block x, by processing logic determining y, which is a motion compensated prediction for x (processing block 1202). Processing logic then computes the transform coefficients of y according to:

$$d = Hy$$

(processing block 1203).

Afterwards, processing logic then determines the prediction weights $\alpha_i$ for each component of d, indexed by the index $i = 1, \ldots, p^2$ (processing blocks 1204 and 1205). Processing logic then forms the prediction vector ĉ as follows:

$$\hat{c}(i) = \alpha_i d(i)$$

(processing block 1206).

Note that, in one embodiment, the prediction may be generated without generating transform coefficients. For example, a pixel domain filter can be applied to the motion compensated prediction, where applying the pixel domain filter is equivalent to doing prediction in the transform domain. In such a case, the process comprises performing motion compensation to generate a first motion compensated prediction using a first block from a previously coded frame; generating a second motion compensated prediction for a second block to be coded from the first motion compensated prediction using a plurality of predictions, including generating each of the plurality of predictions by applying a pixel domain filter to the first motion compensated prediction, where results of applying the pixel domain filter are equivalent to generating predicted transform coefficients, from block transform coefficients, which are subsequently inverse transformed to create the second motion compensated prediction in the pixel domain; subtracting the second motion compensated prediction from a block in a current frame to produce a residual frame; and coding the residual frame.

In another embodiment, a lookup table is designed so that the equivalent pixel domain filter calculations are not done, but transform coefficients are simply used to form an index into the lookup table, which is used in turn to obtain the pixel domain filter, and the filter in turn is applied in pixel domain. That is, in one embodiment, the pixel domain filter is selected from a lookup table based on an index formed from one or more transform coefficients.

Figure 13:
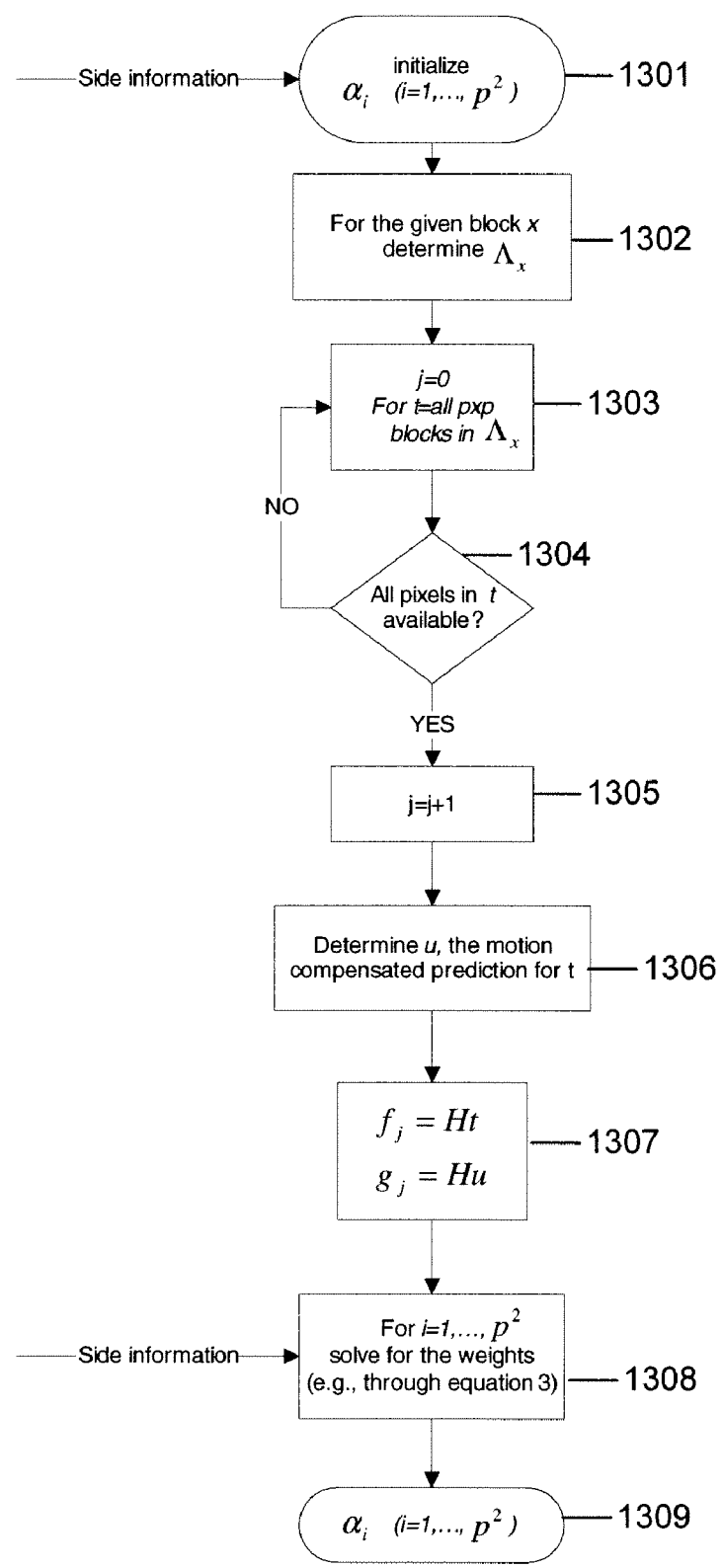
FIG. 13 is a flow diagram of one embodiment of a process for calculating prediction weights.

Referring to FIG. 13, the process begins by processing logic initializing prediction weights $\alpha_i$ (i=1, ..., p$^2$) using side information, if any (processing block 1301). The processing logic, for the given block x, determines the neighborhood $\Lambda_x$ of pixels (processing block 1302).

Processing logic then checks all possible p×p blocks in $\Lambda_x$ to determine if all pixels in the block are available to both the encoder and the decoder, i.e., previously encoded/decoded (processing blocks 1303 and 1304).

If all pixels in the block are available to both the encoder and the decoder, processing logic increments of variable j (processing block 1305) and determines a matching block u in the reference frame via motion compensation (processing block 1306). That is, processing logic determines the motion compensated prediction for block t. Processing logic then computes the transform coefficients for both block t and the matching block u (processing block 1307).

Once the transform coefficients associated with all considered blocks are computed, processing logic solves the prediction weights (using, for example, equation 3 above) with the aid of any side information that is available (processing block 1308). Thereafter, processing logic outputs the prediction weights (processing block 1309).

An Example of a Computer System

Figure 14:
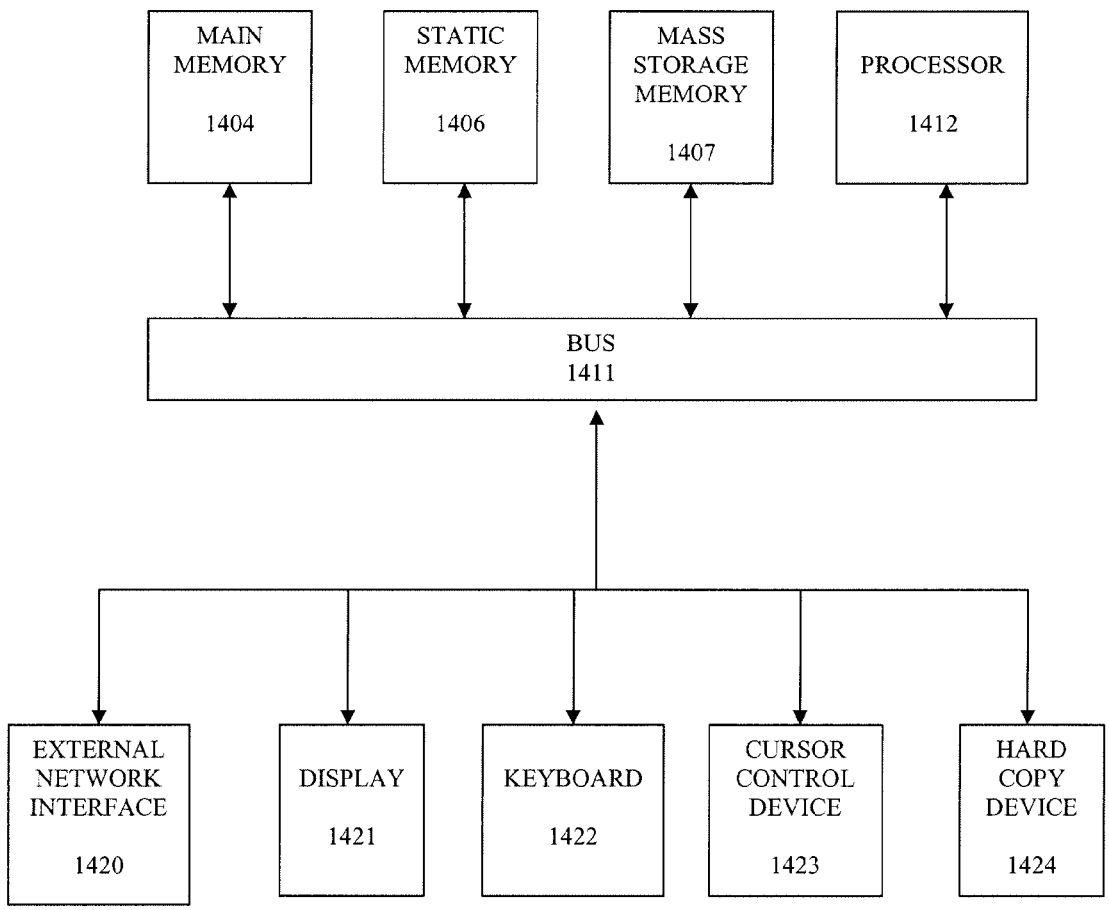
FIG. 14 is a block diagram of an exemplary computer system.

FIG. 14 is a block diagram of an exemplary computer system that may perform one or more of the operations described herein. Referring to FIG. 14, computer system 1400 may comprise an exemplary client or server computer system. Computer system 1400 comprises a communication mechanism or bus 1411 for communicating information, and a processor 1412 coupled with bus 1411 for processing information. Processor 1412 includes a microprocessor, but is not limited to a microprocessor, such as, for example, Pentium™, PowerPC™, Alpha™, etc.

System 1400 further comprises a random access memory (RAM), or other dynamic storage device 1404 (referred to as main memory) coupled to bus 1411 for storing information and instructions to be executed by processor 1412. Main memory 1404 also may be used for storing temporary variables or other intermediate information during execution of instructions by processor 1412.

Computer system 1400 also comprises a read only memory (ROM) and/or other static storage device 1406 coupled to bus 1411 for storing static information and instructions for processor 1412, and a data storage device 1407, such as a magnetic disk or optical disk and its corresponding disk drive. Data storage device 1407 is coupled to bus 1411 for storing information and instructions.

Computer system 1400 may further be coupled to a display device 1421, such as a cathode ray tube (CRT) or liquid crystal display (LCD), coupled to bus 1411 for displaying information to a computer user. An alphanumeric input device 1422, including alphanumeric and other keys, may also be coupled to bus 1411 for communicating information and command selections to processor 1412. An additional user input device is cursor control 1423, such as a mouse, trackball, trackpad, stylus, or cursor direction keys, coupled to bus 1411 for communicating direction information and command selections to processor 1412, and for controlling cursor movement on display 1421.

Another device that may be coupled to bus 1411 is hard copy device 1424, which may be used for marking information on a medium such as paper, film, or similar types of media. Another device that may be coupled to bus 1411 is a wired/wireless communication capability 1425 to communication to a phone or handheld palm device.

Note that any or all of the components of system 1400 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
    performing motion compensation, using a processor, to generate a first motion compensated prediction using a first block from a previously coded frame;
    generating, using the processor, a second motion compensated prediction for a second block to be coded from the first motion compensated prediction using a plurality of predictions in a spatial domain, including generating each of the plurality of predictions by
        generating block transform coefficients for the first block using a transform,
        generating predicted transform coefficients of the second block to be coded using the block transform coefficients, and
        performing an inverse transform on the predicted transform coefficients to create the second motion compensated prediction in the pixel domain;
    subtracting, using a processor, the second motion compensated prediction from a block in a current frame to produce a residual frame; and
    coding the residual frame.

2. The method defined in claim 1 wherein generating predicted transform coefficients comprises multiplying each block transform coefficient of the block with a prediction weight.

3. The method defined in claim 2 wherein the block is an interpolated version of a candidate block.

4. The method defined in claim 2 further comprising:
    determining prediction weights causally using previously coded blocks.

5. The method defined in claim 2 further comprising:
determining prediction weights causally using training blocks.

6. The method defined in claim 5 further comprising:
determining a spatial neighborhood around the block to be coded that includes at least some previously decoded pixels in the frame, the training blocks being within the spatial neighborhood;
identifying matching blocks in a previously coded frame, each of the matching blocks corresponding to one of the training blocks;
obtaining transform coefficients of training blocks and matching blocks; and
generating the prediction weights based on the transform coefficients of training blocks and matching blocks.

7. The method defined in claim 5 wherein the training blocks are overlapping.

8. The method defined in claim 5 further comprising specifying a set of prediction weights using the training blocks and side information.

9. The method defined in claim 1 wherein the transform comprises an overcomplete block transform.

10. The method defined in claim 1 wherein generating the second motion compensated prediction for the block from a plurality of predictions in the spatial domain comprises:
determining a plurality of prediction blocks overlapping the block to be predicted;
generating predictions based on the plurality of prediction blocks; and
performing a linear combination of the plurality of predictions.

11. The method defined in claim 10 wherein the linear combination is formed by averaging.

12. An encoder comprising:
a motion compensation prediction module to perform motion compensation to generate a first motion compensated prediction for a first block;
a second prediction module to receive the motion compensated prediction and generate a second motion compensated prediction for a second block to be coded from a plurality of predictions in a spatial domain, the second prediction module to generate each of the plurality of predictions by
generating block transform coefficients for the first block using a transform,
generating predicted transform coefficients of the second block to be coded using the block transform coefficients, and
performing an inverse transform on the predicted transform coefficients to create the second motion compensated prediction in the pixel domain;
a subtractor to subtract the second motion compensated prediction from a block in a current frame to produce a residual frame; and
a coder to code the residual frame.

13. The encoder defined in claim 12 wherein the second prediction module is operable to generate predicted transform coefficients by multiplying each block transform coefficient of the block with a prediction weight.

14. The encoder defined in claim 13 wherein the second prediction module is operable to determine prediction weights causally using training blocks.

15. The encoder defined in claim 14 wherein the second prediction module is operable to:
determine a spatial neighborhood around the block to be coded that includes at least some previously decoded pixels in the frame, the training blocks being within the spatial neighborhood;
identify matching blocks in a previously coded frame, each of the matching blocks corresponding to one of the training blocks;
obtain transform coefficients of training blocks and matching blocks; and
generate the prediction weights based on the transform coefficients of training blocks and matching blocks.

16. The encoder defined in claim 12 wherein the second prediction module is operable to generate the second motion compensated prediction for the block from a plurality of predictions in the spatial domain by:
determining a plurality of prediction blocks overlapping the block to be predicted;
generating predictions based on the plurality of prediction blocks; and
performing a linear combination of the plurality of predictions.

17. An article of manufacture having one or more computer readable media storing instructions thereon which, when executed by a system, cause the system to perform a method comprising:
performing motion compensation to generate a first motion compensated prediction using a first block from a previously coded frame;
generating a second motion compensated prediction for a second block to be coded from the first motion compensated prediction using a plurality of predictions in a spatial domain, including generating each of the plurality of predictions by
generating block transform coefficients for the first block using a transform,
generating predicted transform coefficients of the second block to be coded using the block transform coefficients, and
performing an inverse transform on the predicted transform coefficients to create the second motion compensated prediction in the pixel domain;
subtracting the second motion compensated prediction from a block in a current frame to produce a residual frame; and
coding the residual frame.

18. A method comprising:
generating, using a processor, a predicted block using a first block from a previously decoded frame;
generating a motion compensated prediction, using a processor, in response to the predicted block, using a plurality of predictions in a spatial domain, including generating each of the plurality of predictions by
generating block transform coefficients for the predicted block using a transform,
generating predicted transform coefficients of a second block to be coded using the block transform coefficients, and
performing an inverse transform on the predicted transform coefficients to create the motion compensated prediction in the pixel domain;
decoding a residual frame using a processor; and
adding, using a processor, the residual frame to the motion compensated prediction.

19. The method defined in claim 18 wherein generating predicted transform coefficients comprises multiplying each block transform coefficient of the block with a prediction weight.

20. The method defined in claim 19 wherein the second prediction module is operable to determine prediction weights causally using training blocks.

21. The method defined in claim 20 further comprising:
determining a spatial neighborhood around the block to be coded that includes at least some previously decoded pixels in the frame, the training blocks being within the spatial neighborhood;
identifying matching blocks in a previously coded frame, each of the matching blocks corresponding to one of the training blocks;
obtaining transform coefficients of training blocks and matching blocks; and
generating the prediction weights based on the transform coefficients of training blocks and matching blocks.

22. The method defined in claim 18 wherein generating the second motion compensated prediction for the block from a plurality of predictions in the spatial domain comprises:
determining a plurality of prediction blocks overlapping the block to be predicted;
generating predictions based on the plurality of prediction blocks; and
performing a linear combination of the plurality of predictions.

23. An apparatus comprising:
a motion compensation unit to generate a predicted block using a first block from a previously decoded frame;
a second prediction module to generate a motion compensated prediction, in response to the predicted block, from a plurality of predictions in a spatial domain, the second prediction module to generate each of the plurality of predictions by
generating block transform coefficients for the predicted block using a transform,
generating predicted transform coefficients of a second block to be coded using the block transform coefficients, and
performing an inverse transform on the predicted transform coefficients to create the motion compensated prediction in the pixel domain;
a decoder to decode a residual frame; and
an adder to add the residual frame to the prediction.

24. The decoder defined in claim 23 wherein the prediction module is operable to generate the motion compensated prediction by:
determining a plurality of prediction blocks overlapping the block to be predicted;
generating predictions based on the plurality of prediction blocks; and
performing a linear combination of the plurality of predictions.

25. The apparatus defined in claim 23 wherein the second prediction module is operable to generate predicted transform coefficients by multiplying each block transform coefficient of the block with a prediction weight, wherein prediction weights are determined causally using training blocks.

* * * * *